United States Patent
Toshioka et al.

(10) Patent No.: US 8,132,402 B2
(45) Date of Patent: Mar. 13, 2012

(54) EXHAUST PURIFICATION DEVICE OF INTERNAL COMBUSTION ENGINE

(75) Inventors: Shunsuke Toshioka, Susono (JP);
Tomihisa Oda, Numazu (JP); Takekazu Itoh, Toyota (JP); Yutaka Tanai, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 541 days.

(21) Appl. No.: 12/309,442

(22) PCT Filed: Apr. 9, 2008

(86) PCT No.: PCT/JP2008/057370
§ 371 (c)(1),
(2), (4) Date: Jan. 16, 2009

(87) PCT Pub. No.: WO2008/133122
PCT Pub. Date: Nov. 6, 2008

(65) Prior Publication Data
US 2009/0301059 A1    Dec. 10, 2009

(30) Foreign Application Priority Data

Apr. 25, 2007   (JP) ................................. 2007-115690

(51) Int. Cl.
*F01N 3/00*   (2006.01)
(52) U.S. Cl. ............... 60/286; 60/277; 60/297; 60/301; 60/303
(58) Field of Classification Search ................ 60/277, 60/286, 295, 297, 301, 303
See application file for complete search history.

(56) References Cited

U.S. PATENT DOCUMENTS

| | | | |
|---|---|---|---|
| 6,363,771 B1 * | 4/2002 | Liang et al. | 73/23.31 |
| 6,701,707 B1 * | 3/2004 | Upadhyay et al. | 60/277 |
| 7,418,816 B2 * | 9/2008 | Upadhyay et al. | 60/285 |
| 7,610,750 B2 * | 11/2009 | Viola et al. | 60/286 |
| 7,617,672 B2 * | 11/2009 | Nishina et al. | 60/277 |
| 7,673,444 B2 * | 3/2010 | Yano et al. | 60/277 |
| 7,892,508 B2 * | 2/2011 | Katoh | 423/213.2 |
| 2003/0051468 A1 | 3/2003 | Van Nieuwstadt et al. | |
| 2007/0113544 A1 | 5/2007 | Nishina et al. | |
| 2008/0034732 A1 | 2/2008 | Hosoya et al. | |

FOREIGN PATENT DOCUMENTS

EP    1 676 984 A1   7/2006

(Continued)

OTHER PUBLICATIONS

Supplementary European Search Report dated Nov. 15, 2010 in corresponding European Application No. 08 740 456.2.

*Primary Examiner* — Binh Q Tran
(74) *Attorney, Agent, or Firm* — Oliff & Berridge, PLC

(57) ABSTRACT

In an internal combustion engine, an $NO_x$ selective reduction catalyst is arranged in the engine exhaust passage, and a urea aqueous solution feed valve is arranged in the engine exhaust passage upstream of the $NO_x$ selective reduction catalyst. Based on the detections results of an $NO_x$ purification rate detecting means for detecting the $NO_x$ purification rate by the $NO_x$ selective reduction catalyst, a urea aqueous solution feed amount detecting means for detecting the amount of feed of the urea aqueous solution, and a urea aqueous solution concentration detecting means for detecting the concentration of the urea aqueous solution, abnormalities in the $NO_x$ selective reduction catalyst, urea aqueous solution feed system, and urea aqueous solution are judged.

6 Claims, 6 Drawing Sheets

FOREIGN PATENT DOCUMENTS

| | | |
|---|---|---|
| EP | 1 801 375 A1 | 6/2007 |
| JP | A-2002-242663 | 8/2002 |
| JP | A-2002-371831 | 12/2002 |
| JP | A-2003-120399 | 4/2003 |
| JP | A-2003-314258 | 11/2003 |
| JP | A-2005-113708 | 4/2005 |
| JP | A-2006-002663 | 1/2006 |
| JP | A-2006-037770 | 2/2006 |
| JP | A-2007-077827 | 3/2007 |
| WO | WO 2007/037730 A1 | 4/2007 |
| WO | WO 2008/014072 A2 | 1/2008 |

* cited by examiner

EXHAUST PURIFICATION DEVICE OF INTERNAL COMBUSTION ENGINE

TECHNICAL FIELD

The present invention relates to an exhaust purification device of an internal combustion engine.

BACKGROUND ART

Known in the art is an internal combustion engine arranging an $NO_x$ selective reduction catalyst in an engine exhaust passage, arranging a urea aqueous solution feed valve in the engine exhaust passage upstream of the $NO_x$ selective reduction catalyst, and using the ammonia produced from the urea aqueous solution fed from the urea aqueous solution feed valve to selectively reduce the $NO_x$ contained in the exhaust gas, the internal combustion engine arranging $NO_x$ sensors at the inlet and outlet of the $NO_x$ selective reduction catalyst to find the $NO_x$ reduction rate by the $NO_x$ selective reduction catalyst from the output values of these $NO_x$ sensors, judging that the $NO_x$ selective reduction catalyst is abnormal when the $NO_x$ reduction rate found from the output values of the $NO_x$ sensors falls below a predetermined $NO_x$ reduction rate range, and judging that the $NO_x$ sensors are abnormal when the $NO_x$ reduction rate found from the output values of the $NO_x$ sensors exceeds a predetermined $NO_x$ reduction rate range (for example, see Japanese Patent Publication (A) No. 2006-37770).

However, with an exhaust purification system using an urea aqueous solution, sometimes the $NO_x$ purification rate drops due to clogging of the urea aqueous solution feed valve and other problems, a drop in concentration of the urea aqueous solution, illicit use of liquids other than an urea aqueous solution, etc. In such a case, with the above-mentioned internal combustion engine, there is a problem that it is not possible to pinpoint the reason for the drop in the $NO_x$ purification rate.

DISCLOSURE OF THE INVENTION

An object of the present invention is to provide an exhaust purification device of an internal combustion engine capable of judging abnormalities in the $NO_x$ selective reduction catalyst, urea aqueous solution feed system, and urea aqueous solution.

According to the present invention, there is provided an exhaust purification device of an internal combustion engine arranging an $NO_x$ selective reduction catalyst in an engine exhaust passage, arranging a urea aqueous solution feed valve in the engine exhaust passage upstream of the $NO_x$ selective reduction catalyst, and using ammonia produced from the urea aqueous solution fed from the urea aqueous solution feed valve to selectively reduce $NO_x$ contained in an exhaust gas, wherein $NO_x$ purification rate detecting means for detecting a $NO_x$ purification rate by the $NO_x$ selective reduction catalyst, urea aqueous solution feed amount detecting means for detecting an amount of feed of the urea aqueous solution, and urea aqueous solution concentration detecting means for detecting the concentration of the urea aqueous solution are provided, and abnormalities of the $NO_x$ selective reduction catalyst, urea aqueous solution feed system and urea aqueous solution are judged based on detection results by the $NO_x$ purification rate detecting means, urea aqueous solution feed amount detecting means and urea aqueous solution concentration detecting means.

BEST MODE FOR CARRYING OUT THE INVENTION

Figure 1:
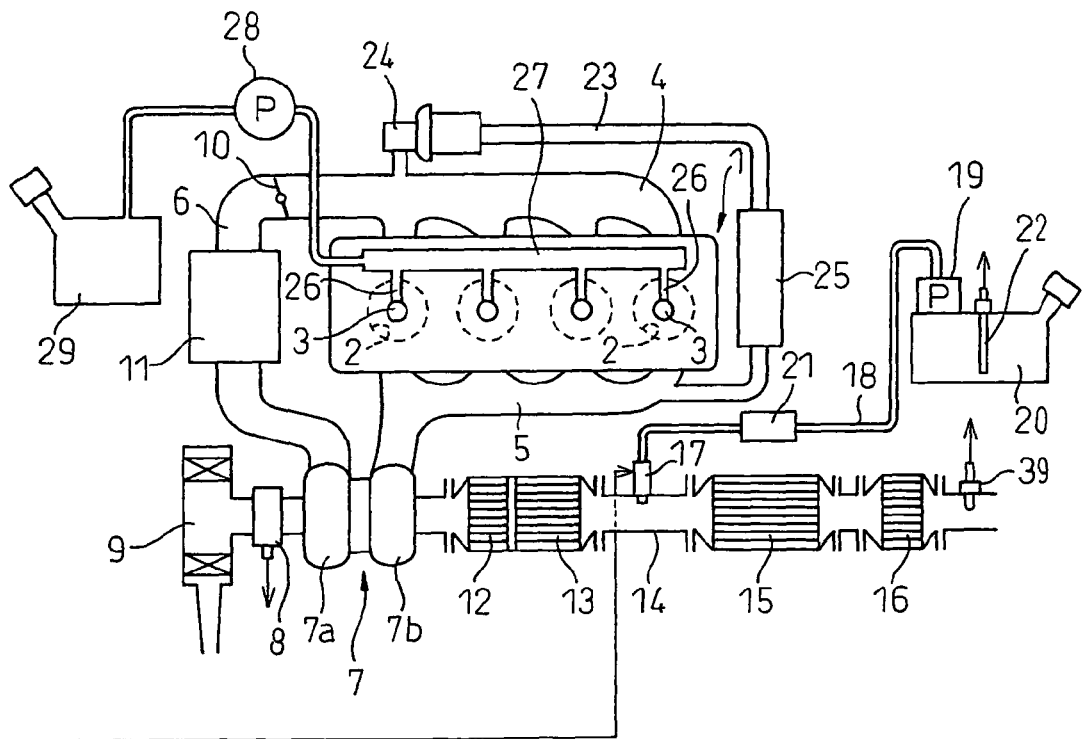
FIG. 1 is an overview of a compression ignition type internal combustion engine.

FIG. 1 shows an overview of a compression ignition type internal combustion engine.

Referring to FIG. 1, 1 indicates an engine body, 2 a combustion chamber of a cylinder, 3 an electronic control type fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7, while the inlet of the compressor 7a is connected through an intake air detector 8 to an air cleaner 9. Inside the intake duct 6, a throttle valve 10 driven by a step motor is arranged. Further, around the intake duct 6, a cooling device 11 for cooling the intake air flowing through the inside of the intake duct 6 is arranged. In the embodiment shown in FIG. 1, the engine cooling water is guided to the cooling device 11 where the engine cooling water cools the intake air.

On the other hand, the exhaust manifold 5 is connected to the inlet of an exhaust turbine 7b of the exhaust turbocharger 7, while the outlet of the exhaust turbine 7b is connected to the inlet of an oxidation catalyst 12. Downstream of the oxidation catalyst 12, a particulate filter 13 is arranged adjacent to the oxidation catalyst 12 for collecting particulate matter contained in the exhaust gas, while the outlet of this particulate filter 13 is connected through an exhaust pipe 14 to the inlet of an $NO_x$ selective reducing catalyst 15. The outlet of this $NO_x$ selective reducing catalyst 15 is connected to an oxidation catalyst 16.

Inside an exhaust pipe 14 upstream of the $NO_x$ selective reducing catalyst 15, an aqueous urea solution feed valve 17 is arranged. This aqueous urea solution feed valve 17 is connected through a feed pipe 18 and a feed pump 19 to an aqueous urea solution tank 20. Urea aqueous solution feed amount detecting means, for example, a flowmeter 21 is arranged in the feed pipe 18, and urea aqueous solution concentration detecting means, for example, a urea concentration sensor 22 is arranged in the aqueous urea solution tank 20. The aqueous urea solution stored inside the aqueous urea solution tank 20 is injected by the feed pump 19 into the exhaust gas flowing from the aqueous urea solution feed valve 17 inside the exhaust pipe 14, while the ammonia (($NH_2$)$_2$$CO+H_2O \rightarrow 2NH_3+CO_2$) generated from urea causes the $NO_x$ contained in the exhaust gas to be reduced in the $NO_x$ selective reducing catalyst 15.

The exhaust manifold 5 and the intake manifold 4 are connected to each other through an exhaust gas recirculation (hereinafter referred to as the "EGR") passage 23. Inside the EGR passage 23 is arranged an electronic control type EGR control valve 24. Further, around the EGR passage 23 is arranged a cooling device 25 for cooling the EGR gas flowing through the inside of the EGR passage 23. In the embodiment shown in FIG. 1, the engine cooling water is guided through the cooling device 25, where the engine cooling water is used to cool the EGR gas. On the other hand, each fuel injector 3 is connected through a fuel feed pipe 26 to a common rail 27. This common rail 27 is connected through an electronically controlled variable discharge fuel pump 28 to a fuel tank 29. The fuel stored in the fuel tank 29 is fed by the fuel pump 28 into the common rail 27, and the fuel fed to the inside of the common rail 27 is fed through each fuel pipe 26 to the fuel injectors 3.

An electronic control unit 30 is comprised of a digital computer provided with a ROM (read only memory) 32, RAM (random access memory) 33, CPU (microprocessor) 34, input port 35, and output port 36 all connected to each other by a bi-directional bus 31. $NO_x$ purification rate detecting means for detecting the $NO_x$ purification rate by the $NO_x$ selective reduction catalyst 15, for example, a $NO_x$ sensor 39 for detecting the $NO_x$ concentration in the exhaust gas is arranged at the downstream of the oxidation catalyst 16, and the output signals of the flowmeter 21, the urea concentration sensor 22, $NO_x$ sensor 29 and intake air detector 8 are input through corresponding AD converters 37 into the input port 35. In addition, the accelerator pedal 40 has a load sensor 41 generating an output voltage proportional to the amount of depression L of the accelerator pedal 40 connected to it. The output voltage of the load sensor 41 is input through a corresponding AD converter 37 to the input port 35. Further, the input port 35 has a crank angle sensor 42 generating an output pulse each time the crank shaft rotates by for example 15° C. connected to it. On the other hand, the output port 36 is connected through corresponding drive circuits 38 to the fuel injectors 3, throttle valve 10 drive step motor, aqueous urea solution feed valve 17, feed pump 19, EGR control valve 24, and fuel pump 28.

The oxidation catalyst 12 for example carries a precious metal catalyst such as platinum. This oxidation catalyst 12 acts to convert the NO contained in the exhaust gas to $NO_2$ and acts to oxidize the HC contained in the exhaust gas. That is, $NO_2$ is more oxidizable than NO, therefore if NO is converted to $NO_2$, the oxidation reaction of the particulate matter trapped on the particulate filter 13 is promoted and, further, the reduction action by the ammonia at the $NO_x$ selective reduction catalyst 15 is promoted. As the particulate filter 13, a particulate filter not carrying any catalyst can be used. For example, a particulate filter carrying a precious metal catalyst such as platinum can also be used. On the other hand, an $NO_x$ selective reduction catalyst 15 can be comprised from an ammonia adsorption type Fe zeolite having a high $NO_x$ purification rate at a low temperature and can be comprised from a titania-vanadium-based catalyst having no ammonia adsorption function. An oxidation catalyst 16 for example carries a precious metal catalyst comprised of platinum. This oxidation catalyst 16 acts to oxidize the ammonia leaking out from the $NO_x$ selective reduction catalyst 15.

Figure 2:
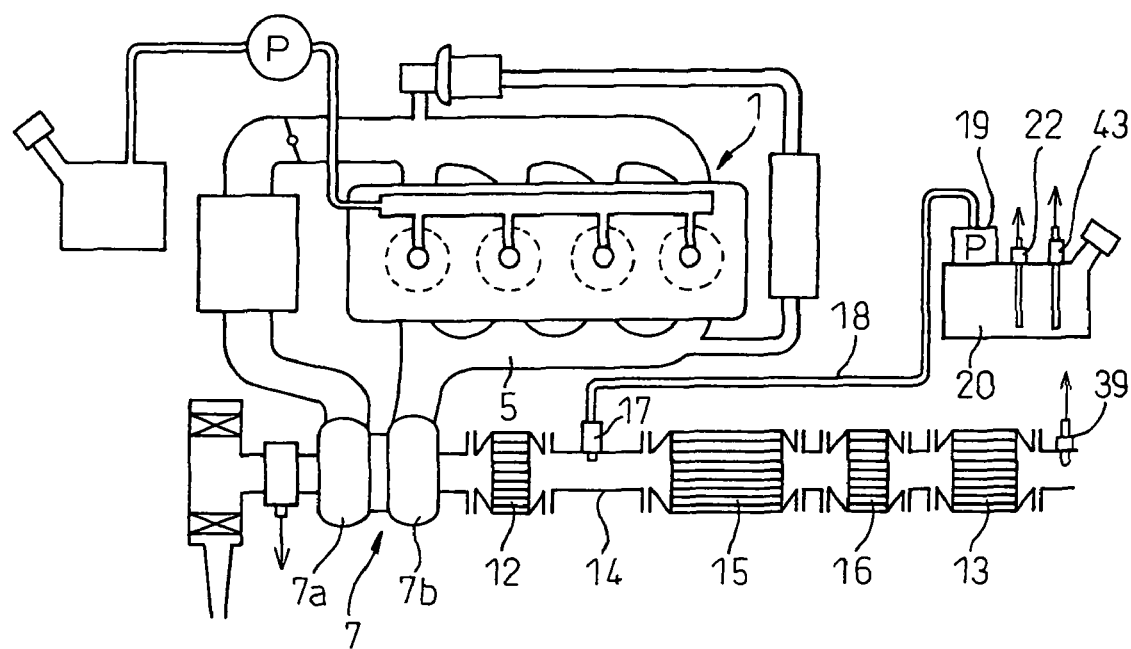
FIG. 2 is an overview showing another embodiment of a compression ignition type internal combustion engine.

FIG. 2 shows another embodiment of a compression ignition type internal combustion engine. In this embodiment, as urea aqueous solution feed amount detecting means for detecting the amount of feed of urea aqueous solution, a level sensor 43 is provided for detecting the liquid level of the urea aqueous solution inside the urea aqueous solution tank 20. Further, in this embodiment, the particulate filter 13 is arranged downstream of the oxidation catalyst 16. Accordingly, in this embodiment, the outlet of oxidation catalyst 12 is connected through the exhaust pipe 14 to the inlet of the $NO_x$ selective reduction catalyst 15.

In the exhaust purification system shown in FIG. 1 and FIG. 2, a typical case of a drop in the $NO_x$ purification rate is when the $NO_x$ selective reduction catalyst 15 deteriorates. If the $NO_x$ selective reduction catalyst 15 deteriorates, the $NO_x$ concentration in the exhaust gas flowing out from the $NO_x$ selective reduction catalyst 15 rises and as a result the output level of the $NO_x$ sensor 39 rises. Accordingly, it is possible to judge if the $NO_x$ selective reduction catalyst 15 has deteriorated from the output level of the $NO_x$ sensor 39.

However, even if the $NO_x$ selective reduction catalyst 15 does not deteriorate, the $NO_x$ purification rate can drop due to other reasons. In this case as well, the output level of the $NO_x$ sensor 39 rises. Accordingly, just because the output level of the $NO_x$ sensor 39 has risen, it cannot be judged immediately that the $NO_x$ selective reduction catalyst 15 has deteriorated.

As causes for the drop in the $NO_x$ purification rate drop other than deterioration of the $NO_x$ selective reduction catalyst 15, two causes may be considered. One cause is when the amount of feed of the urea aqueous solution has dropped from the regular amount due to, for example, clogging of the urea aqueous solution feed valve 17, clogging or breakage of the feed pipe 18, deterioration, failure, etc. of the feed pump 19, etc., that is, problems in the urea aqueous solution feed system. If the amount of feed of urea aqueous solution falls, the $NO_x$ is no longer sufficiently purified, so the $NO_x$ purification rate falls.

The other cause is when the concentration of the urea aqueous solution falls due to illicit use of a liquid other than a urea aqueous solution or some other reason. If the concentration of the urea aqueous solution falls, the $NO_x$ is no longer sufficiently purified, so the $NO_x$ purification rate falls.

In this way, even if the $NO_x$ selective reduction catalyst 15 deteriorates, that is, even if it becomes abnormal, even if the amount of feed of urea aqueous solution falls, that is, even if the feed system of the urea aqueous solution becomes abnormal, and even if the concentration of the urea aqueous solution falls, that is, the urea aqueous solution becomes abnormal, the $NO_x$ purification rate falls.

Therefore, in the present invention, to pinpoint the cause for the $NO_x$ purification rate dropping, first it is judged if the $NO_x$ purification rate has fallen, that is, if the $NO_x$ purification rate is abnormal. That is to say, when the $NO_x$ purification rate is not abnormal, probably the $NO_x$ selective reduction catalyst, urea aqueous solution feed system, and the urea aqueous solution are all normal. Therefore, at this time, it is not necessary to pinpoint the cause of any abnormality.

On the other hand, when it is judged that the $NO_x$ purification rate is abnormal, it is judged if the urea aqueous solution feed system and the urea aqueous solution are abnormal. When it is judged at this time that the urea aqueous solution feed system and the urea aqueous solution are not abnormal, it is judged that the $NO_x$ selective reduction catalyst 15 is abnormal.

On the other hand, when it is judged that the $NO_x$ purification rate is abnormal and when it is judged that the urea aqueous solution feed system is also abnormal, it cannot be determined if the $NO_x$ purification rate is abnormal because the $NO_x$ selective reduction catalyst 15 is abnormal or if the $NO_x$ purification rate is abnormal because the urea aqueous solution feed system is abnormal. Therefore, in this case, the amount of feed of the urea aqueous solution is increased or decreased so that the amount of feed of the urea aqueous solution becomes a normal amount of feed. When the $NO_x$ purification rate stops being abnormal at this time, it is judged that the urea aqueous solution feed system is abnormal.

Further, when it is judged that the $NO_x$ purification rate is abnormal and when it is judged that the urea aqueous solution is also abnormal, it cannot be determined if the $NO_x$ purification rate is abnormal because the $NO_x$ selective reduction catalyst 15 is abnormal or if the $NO_x$ purification rate is abnormal because the urea aqueous solution is abnormal. Therefore, in this case, the amount of feed of the urea aqueous solution is increased or decreased so that the amount of feed of urea becomes a normal amount of feed. When the $NO_x$ purification rate stops being abnormal at this time, it is judged that the urea aqueous solution is abnormal.

Next, the routine for detecting abnormalities will be explained with reference to FIG. 3. This abnormality detection routine is executed at least once during operation of the vehicle.

Figure 3:
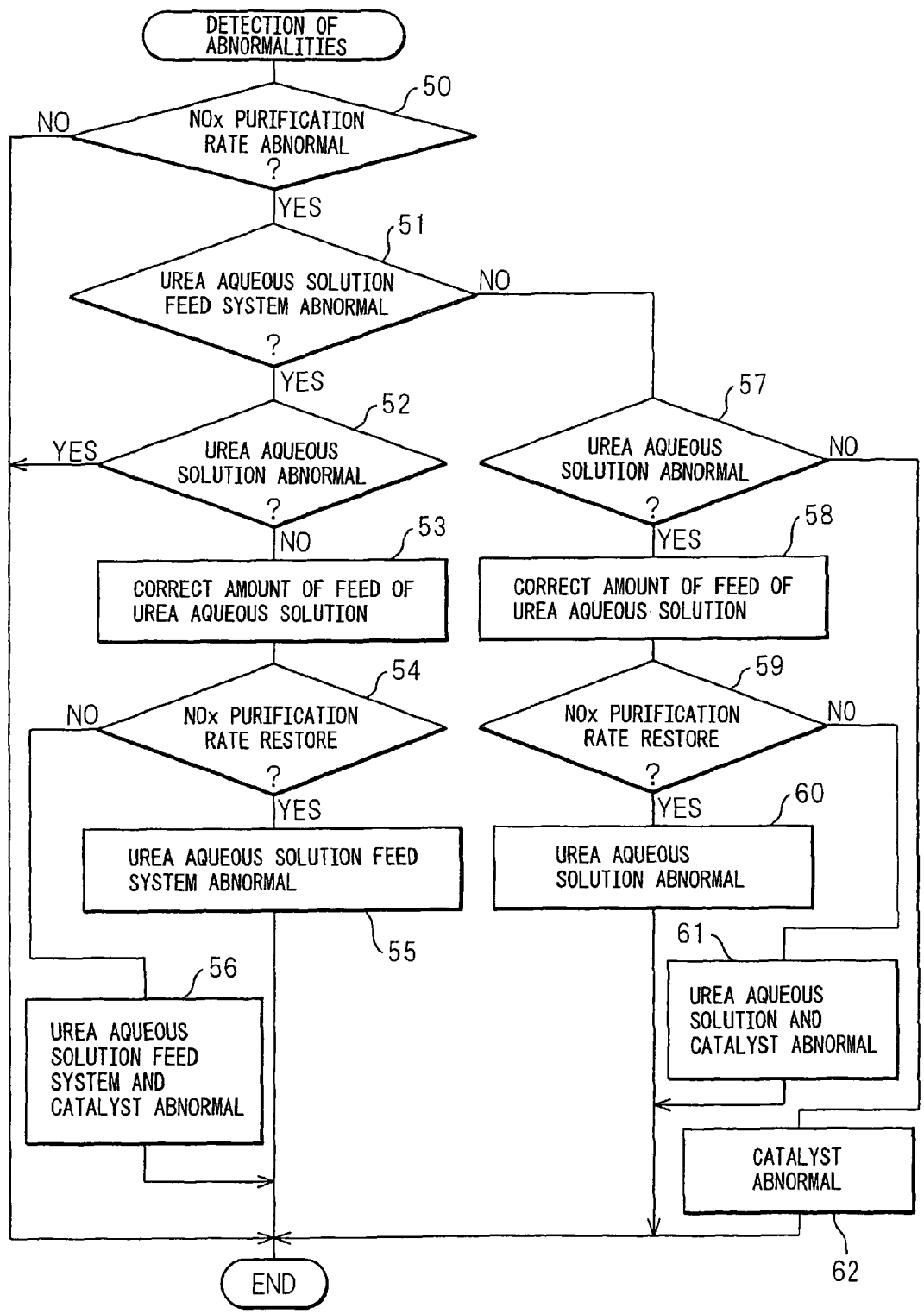
FIG. 3 is a flow chart for detecting abnormalities.

Referring to FIG. 3, first, at step 50, it is judged from the output value of the $NO_x$ sensor 39 if the $NO_x$ purification rate has fallen below a fixed level, that is, if the $NO_x$ purification rate is abnormal. When the $NO_x$ purification rate is not abnormal, the processing cycle ends. At this time, it is judged that the $NO_x$ selective reduction catalyst 15, the urea aqueous solution feed system, and the urea aqueous solution are all normal.

On the other hand, when it is judged that the $NO_x$ purification rate is abnormal, the routine proceeds to step 51, where it is judged if the urea aqueous solution feed system is abnormal. A first embodiment of this abnormality judgment routine of the urea aqueous solution feed system is shown in FIG. 4, and a second embodiment is shown in FIG. 5.

Figure 4:
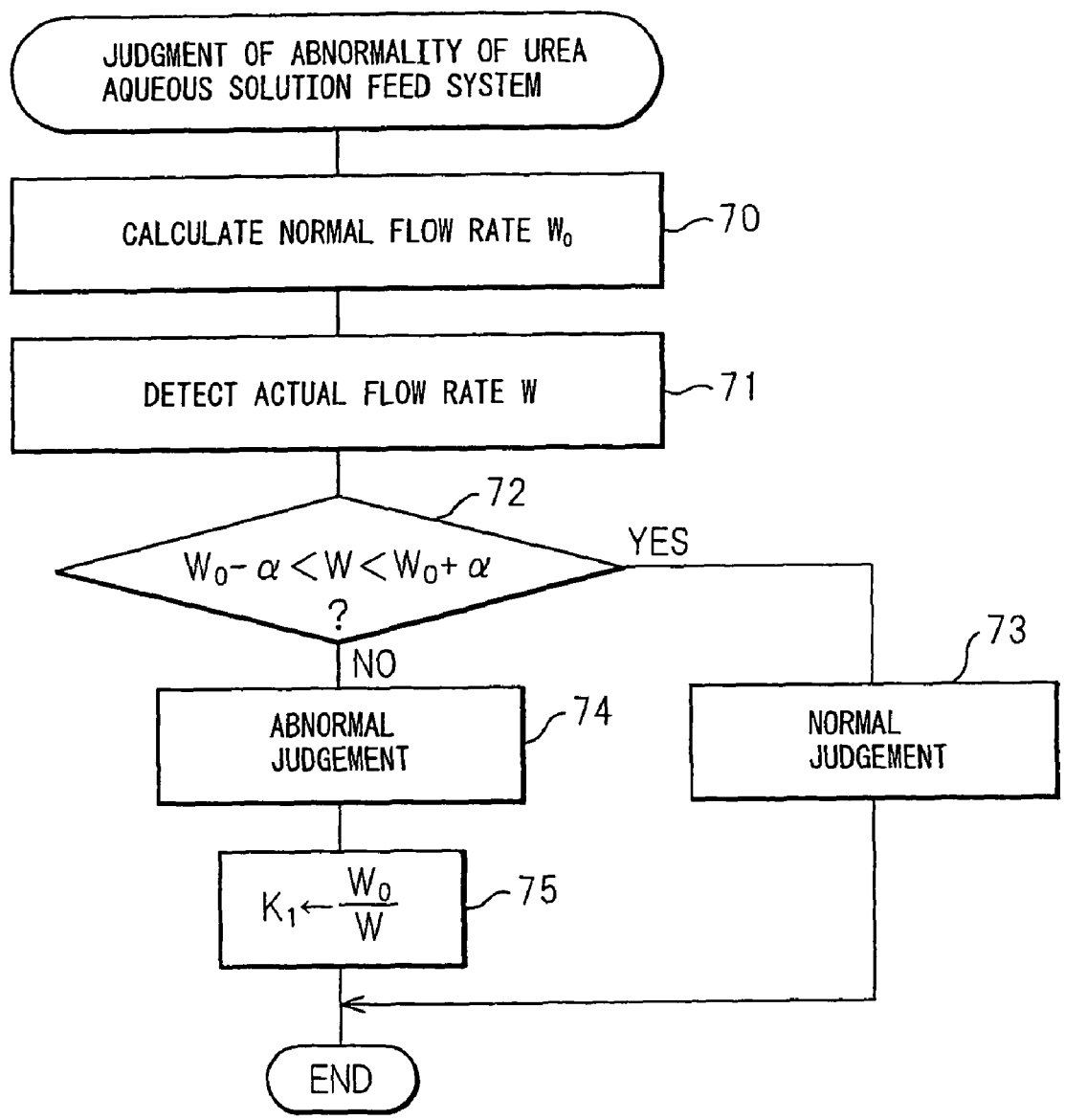
FIG. 4 is a flowchart for judging an abnormality of a urea aqueous solution feed system.

First, referring to the first embodiment shown in FIG. 4, at step 70, the flow rate $W_0$ of the urea aqueous solution at normal times is calculated from the amount of feed of urea aqueous solution determined according to the operating state of the engine. Next, at step 71, the actual flow rate W of urea aqueous solution is detected from the output signal of the flowmeter 21 shown in FIG. 1. Next, at step 72, it is judged if the actual flow rate W of the urea aqueous solution is between $W_0-\alpha$ (where $\alpha$ is a constant value of a small value) and $W_0+\alpha$, that is, is within an allowable range considered normal. When $W_0-\alpha<W<W_0+\alpha$, the routine proceeds to step 73, where it is judged that it is normal.

As opposed to this, at step 72, when it is judged that $W_0-\alpha \geqq W$ or $W \geqq W_0+\alpha$, the routine proceeds to step 74 where it is judged that the urea aqueous solution feed system is abnormal. At this time, at step 75, the increase rate, in some cases, the reduction rate $K_1$ ($=W_0/W$) of the urea aqueous solution necessary for making the flow rate of urea aqueous solution the normal flow rate $W_0$ is calculated.

Figure 5:
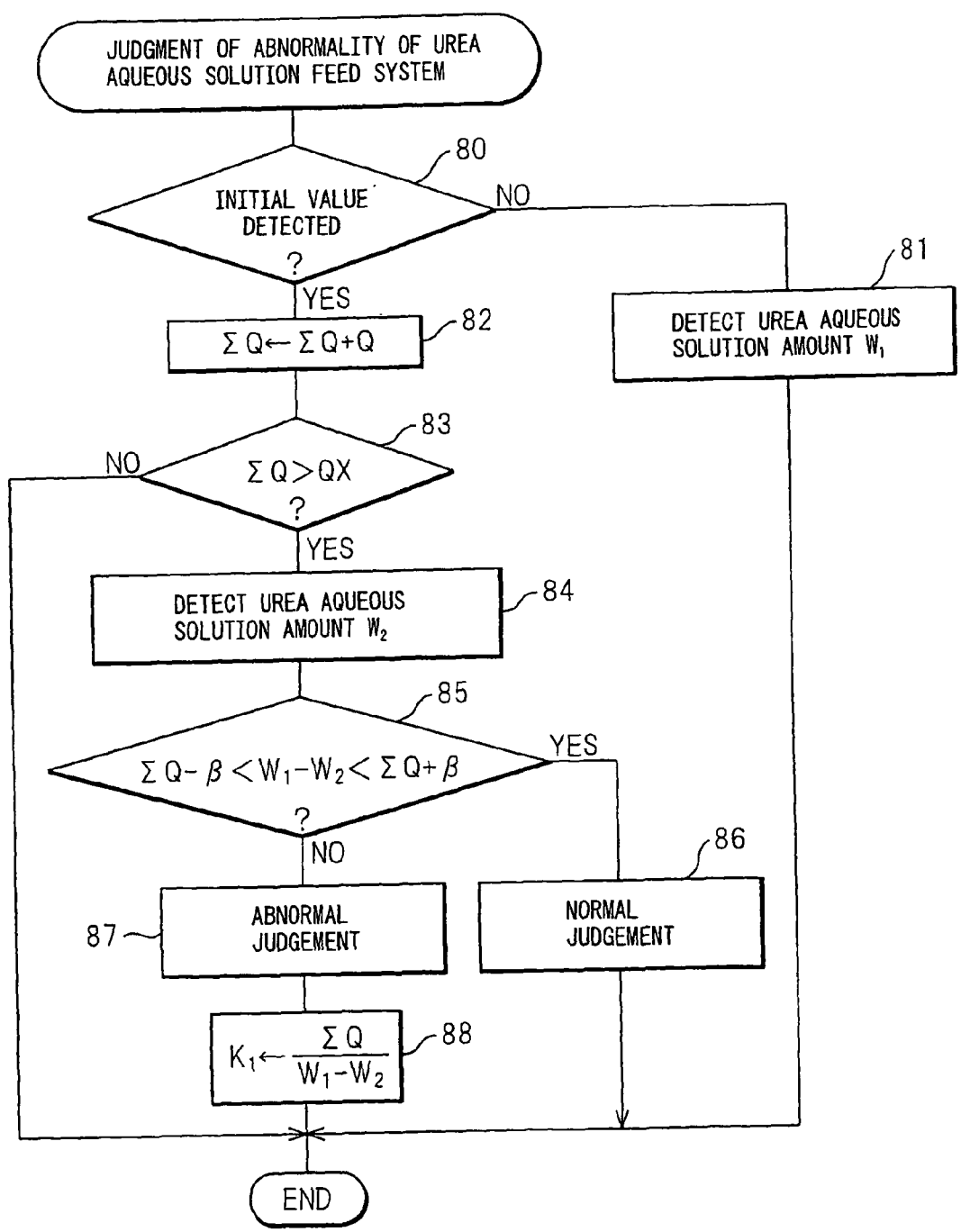
FIG. 5 is a flow chart for judging an abnormality of a urea aqueous solution feed system.

On the other hand, the abnormality judgment routine of the urea aqueous solution feed system shown in FIG. 5 is executed by interruption every predetermined time interval.

Referring to FIG. 5, first, at step 80, it is judged if the initial value of the amount of urea inside the urea aqueous solution tank 20 has been detected. When the initial value has not been detected, the routine proceeds to step 81 where the amount of urea aqueous solution $W_1$ inside the urea aqueous solution tank 20 is detected by the level sensor 43 shown in FIG. 2. When the initial value finishes being detected, the routine proceeds to step 82 where the cumulative value $\Sigma Q$ of the amount of feed Q of the urea aqueous solution determined in accordance with the operating state of the engine is calculated.

Next, at step 83, it is judged if the cumulative value $\Sigma Q$ of the amount of feed of the urea aqueous solution exceeds the set value QX. When $\Sigma Q>QX$, the routine proceeds to step 84 where the amount of urea aqueous solution $W_2$ inside the urea aqueous solution tank 20 is detected. Next, at step 85, it is judged if the actual consumed amount $W_1-W_2$ of the urea aqueous solution is between $\Sigma Q-\beta$ ($\beta$ is a constant value of a small value) and $\Sigma Q+\beta$, that is, is within an allowable range considered normal. When $\Sigma Q-\beta<W_1-W_2<\Sigma Q+\beta$, the routine proceeds to step 86 where it is judged that it is normal.

As opposed to this, when it is judged at step 85 that $\Sigma Q-\beta \geqq W_1-W_2$ or $W_1-W_2 \geqq \Sigma Q+\beta$, the routine proceeds to step 87 where it is judged that the urea aqueous solution feed system is abnormal. At this time, at step 88, the increase rate, in some cases, the reduction rate $K_1$ ($=\Sigma Q/(W_1-W_2)$) of the urea aqueous solution necessary for making the amount of feed of the urea aqueous solution a normal amount of feed, is calculated.

Returning to FIG. 3 again, at step 51, it is judged if the urea aqueous solution feed system is abnormal by the routine shown in FIG. 4 or FIG. 5. When it is judged at step 51 that the urea aqueous solution feed system is not abnormal, the routine proceeds to step 57 where it is judged if the urea aqueous solution is abnormal. This abnormality judgment routine of the urea aqueous solution is shown in FIG. 6.

Figure 6:
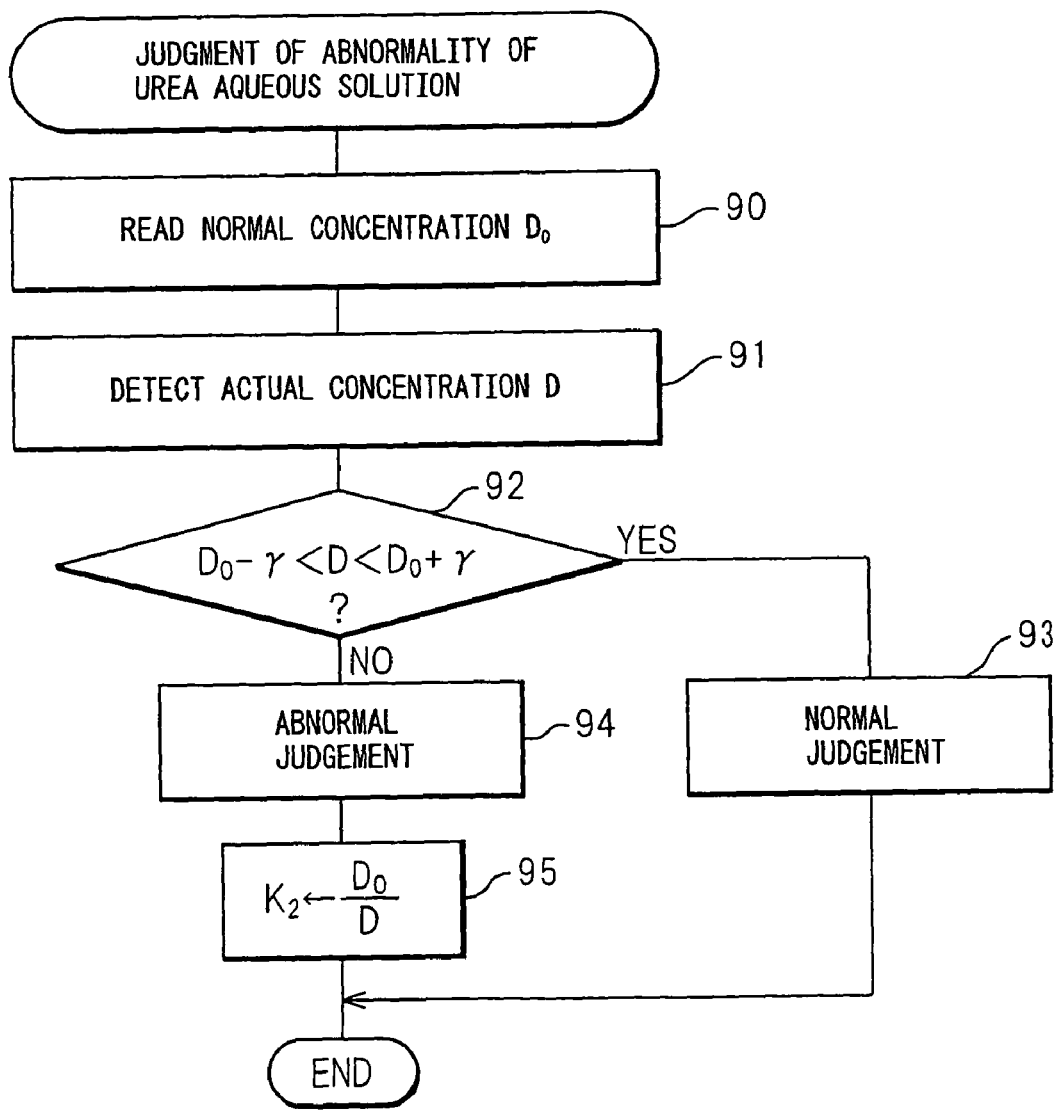
FIG. 6 is a flow chart for judging an abnormality of a urea aqueous solution.

Referring to FIG. 6, first, at step 90, the predetermined normal concentration $D_0$ of the urea aqueous solution is read. Next, at step 91, the actual concentration D of the urea aqueous solution is detected from the output signal of the urea concentration sensor 22. Next, at step 92, it is judged if the actual concentration D of the urea aqueous solution is between $D_0-\gamma$ ($\gamma$ is a constant value of a small value) and $D_0+\gamma$, that is, is within an allowable range considered normal. When $D_0-\gamma<D<D_0+\gamma$, the routine proceeds to step 93 where it is judged that it is normal.

As opposed to this, when it is judged at step 92 that $D_0-\gamma \geqq D$ or $D \geqq D_0+\gamma$, the routine proceeds to step 94 where it is judged that the urea aqueous solution is abnormal. At this time, at step 95, the increase rate, in some cases, the reduction rate $K_2$ ($=D_0/D$) of the urea aqueous solution necessary for making the amount of feed of the urea aqueous solution a normal amount of feed is calculated.

When it is judged at step 57 of FIG. 3 that the urea aqueous solution is not abnormal by the routine shown in FIG. 6, the routine proceeds to step 62 where it is judged that the $NO_x$ selective reduction catalyst 15 is abnormal.

On the other hand, when it is judged at step 51 that the urea aqueous solution feed system is abnormal, the routine proceeds to step 52 where it is judged if the urea aqueous solution is abnormal by the routine shown in FIG. 6. When the urea aqueous solution is abnormal, the processing cycle ends. As opposed to this, when it is judged at step 52 that the urea aqueous solution is not abnormal, the routine proceeds to step 53 where for example the opening timing of the intermittently injecting urea aqueous solution feed valve 17 is made a multiple of $K_1$ calculated in FIG. 4 or FIG. 5 so that the amount of feed of the urea aqueous solution becomes a normal amount of feed.

Next, at step 54, it is judged from the output value of the $NO_x$ sensor 39 if the $NO_x$ purification rate has recovered up to the allowable range. When the $NO_x$ purification rate has recovered, the routine proceeds to step 55 where it is judged that the urea aqueous solution feed system is abnormal. As opposed to this, when it is judged at step 54 that the $NO_x$ purification rate has not recovered, the routine proceeds to step 56 where it is judged that the urea aqueous solution feed system and the $NO_x$ selective reduction catalyst 15 are both abnormal.

On the other hand, when it is judged at step 57 that the urea aqueous solution is abnormal, the routine proceeds to step 58 where for example the opening timing of the intermittently injecting urea aqueous solution feed valve 17 is made a multiple of $K_2$ calculated in FIG. 6 so that the amount of feed of the urea aqueous solution becomes a normal amount of feed.

Next, at step 59, it is judged from the output value of the $NO_x$ sensor 39 if the $NO_x$ purification rate has recovered up to the allowable range. When the $NO_x$ purification rate has recovered, the routine proceeds to step 60 where it is judged that the urea aqueous solution is abnormal. As opposed to this, when it is judged at step 59 that the $NO_x$ purification rate has not recovered, the routine proceeds to step 61 where it is judged that the urea aqueous solution and the $NO_x$ selective reduction catalyst 15 are both abnormal.

The invention claimed is:

1. An exhaust purification device of an internal combustion engine, the exhaust purification device comprising:
   an $NO_x$ selective reduction catalyst disposed in an engine exhaust passage of the internal combustion engine,
   a urea aqueous solution feed system including a urea aqueous solution feed valve disposed in the engine exhaust passage upstream of the $NO_x$ selective reduction catalyst, ammonia produced from the urea aqueous solution fed from the urea aqueous solution feed valve selectively reducing $NO_x$ contained in an exhaust gas output by the $NO_x$ selective reduction catalyst,
   a $NO_x$ purification amount detector that detects a $NO_x$ purification amount achieved by the $NO_x$ selective reduction catalyst,
   a urea aqueous solution feed amount detector that detects a feed amount of the urea aqueous solution,
   a urea aqueous solution concentration detector that detects a concentration of the urea aqueous solution, and
   a control unit that judges whether abnormalities exist in the $NO_x$ selective reduction catalyst, the urea aqueous solution feed system, and the urea aqueous solution concentration based on detection results of the $NO_x$ purification amount detector, the urea aqueous solution feed amount detector and the urea aqueous solution concentration detector,
   wherein when the control unit judges that the $NO_x$ purification amount is abnormal and that the urea aqueous solution feed system and the urea aqueous solution concentration are not abnormal, the control unit judges that the $NO_x$ selective reduction catalyst is abnormal.

2. An exhaust purification device of an internal combustion engine as claimed in claim 1, wherein first the control unit judges if the $NO_x$ purification amount is abnormal and, when it is judged that the $NO_x$ purification amount is abnormal, the control unit judges if the urea aqueous solution feed system and the urea aqueous solution concentration are abnormal.

3. An exhaust purification device of an internal combustion engine, the exhaust purification device comprising:
   an $NO_x$ selective reduction catalyst disposed in an engine exhaust passage of the internal combustion engine,
   a urea aqueous solution feed system including a urea aqueous solution feed valve disposed in the engine exhaust passage upstream of the $NO_x$ selective reduction catalyst, ammonia produced from the urea aqueous solution fed from the urea aqueous solution feed valve selectively reducing $NO_x$ contained in an exhaust gas output by the $NO_x$ selective reduction catalyst,
   a $NO_x$ purification amount detector that detects a $NO_x$ purification amount achieved by the $NO_x$ selective reduction catalyst,
   a urea aqueous solution feed amount detector that detects a feed amount of the urea aqueous solution,
   a urea aqueous solution concentration detector that detects a concentration of the urea aqueous solution, and
   a control unit that judges whether abnormalities exist in the $NO_x$ selective reduction catalyst, the urea aqueous solution feed system, and the urea aqueous solution concentration based on detection results of the $NO_x$ purification amount detector, the urea aqueous solution feed amount detector and the urea aqueous solution concentration detector,
   wherein when the control unit judges that the $NO_x$ purification amount is abnormal and that the urea aqueous solution feed system is also abnormal, the control unit causes the urea aqueous solution feed system to increase or decrease the feed amount of the urea aqueous solution so that the feed amount of the urea aqueous solution becomes a normal feed amount and, when the $NO_x$ purification amount subsequently becomes not abnormal, the control unit judges that the urea aqueous solution feed system is abnormal.

4. An exhaust purification device of an internal combustion engine, the exhaust purification device comprising:
   an $NO_x$ selective reduction catalyst disposed in an engine exhaust passage of the internal combustion engine,
   a urea aqueous solution feed system including a urea aqueous solution feed valve disposed in the engine exhaust passage upstream of the $NO_x$ selective reduction catalyst, ammonia produced from the urea aqueous solution fed from the urea aqueous solution feed valve selectively reducing $NO_x$ contained in an exhaust gas output by the $NO_x$ selective reduction catalyst,
   a $NO_x$ purification amount detector that detects a $NO_x$ purification amount achieved by the $NO_x$ selective reduction catalyst,
   a urea aqueous solution feed amount detector that detects a feed amount of the urea aqueous solution,
   a urea aqueous solution concentration detector that detects a concentration of the urea aqueous solution, and
   a control unit that judges whether abnormalities exist in the $NO_x$ selective reduction catalyst, the urea aqueous solution feed system, and the urea aqueous solution concentration based on detection results of the $NO_x$ purification amount detector, the urea aqueous solution feed amount detector and the urea aqueous solution concentration detector,
   wherein when the control unit judges that the $NO_x$ purification amount is abnormal and that the urea aqueous solution concentration is also abnormal, the control unit causes the urea aqueous solution feed system to increase or decrease the feed amount of the urea aqueous solution so that the feed amount of urea becomes a normal feed amount and, when the $NO_x$ purification amount subsequently becomes not abnormal, the control unit judges that the urea aqueous solution concentration is abnormal.

5. An exhaust purification device of an internal combustion engine as claimed in claim 3, wherein first the control unit judges if the $NO_x$ purification amount is abnormal and, when it is judged that the $NO_x$ purification amount is abnormal, the control unit judges if the urea aqueous solution feed system and the urea aqueous solution concentration are abnormal.

6. An exhaust purification device of an internal combustion engine as claimed in claim 4, wherein first the control unit judges if the $NO_x$ purification amount is abnormal and, when it is judged that the $NO_x$ purification amount is abnormal, the control unit judges if the urea aqueous solution feed system and the urea aqueous solution concentration are abnormal.

* * * * *